United States Patent [19]

Bonin et al.

[11] 4,422,809

[45] Dec. 27, 1983

[54] COAL PUMP

[75] Inventors: John H. Bonin, Sunnyvale; John W. Meyer, Palo Alto; Arnold D. Daniel, Jr., Alameda County Fairgrounds, all of Calif.

[73] Assignee: Lockheed Missiles & Space Co., Inc., Sunnyvale, Calif.

[21] Appl. No.: 273,606

[22] Filed: Jun. 15, 1981

Related U.S. Application Data

[63] Continuation of Ser. No. 036,843, May 7, 1979, abandoned.

[51] Int. Cl.³ .............................................. B65G 53/40
[52] U.S. Cl. ...................................... 406/98; 406/99; 406/106; 414/217; 415/90
[58] Field of Search ..................... 406/52, 71, 96, 98, 406/99, 102, 106; 414/217; 417/85; 239/223, 224; 415/90

[56] References Cited

U.S. PATENT DOCUMENTS

| | | | |
|---|---|---|---|
| 3,045,428 | 7/1962 | McLean | 415/90 X |
| 4,265,580 | 5/1981 | Meyer | 414/217 |
| 4,362,441 | 12/1982 | Meyer et al. | 406/99 X |
| 4,376,608 | 3/1983 | Meyer et al. | 414/217 |

*Primary Examiner*—Jeffrey V. Nase
*Attorney, Agent, or Firm*—H. Donald Volk

[57] ABSTRACT

A device for pressurizing pulverized coal and circulating a carrier gas is disclosed. This device has utility in a coal gasification process and eliminates the need for a separate collection hopper and eliminates the separate compressor.

8 Claims, 3 Drawing Figures

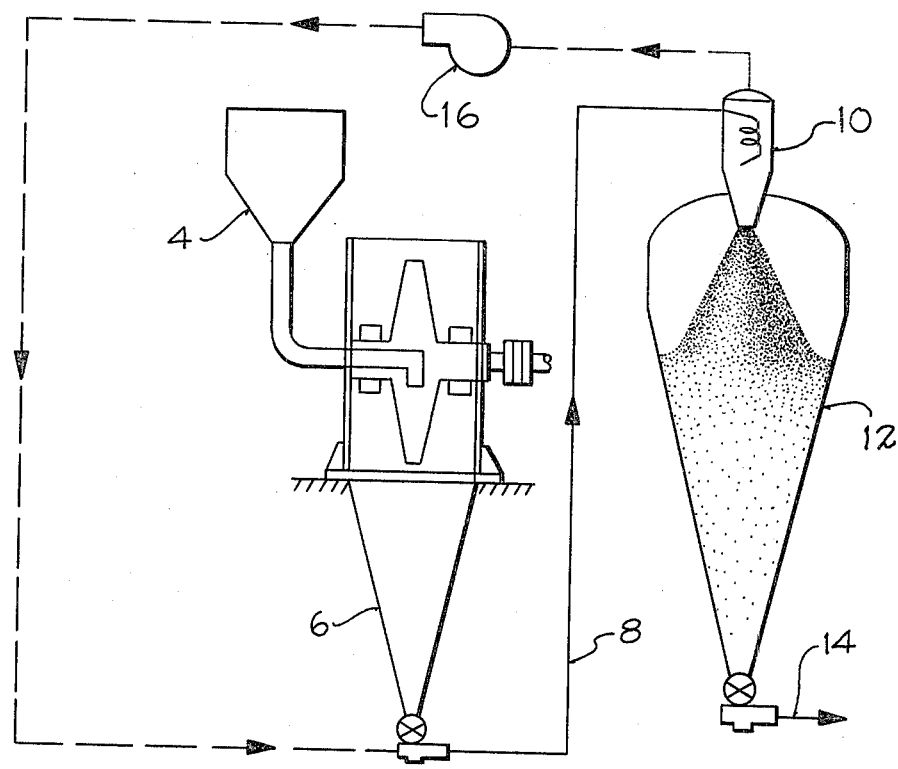
FIG_1
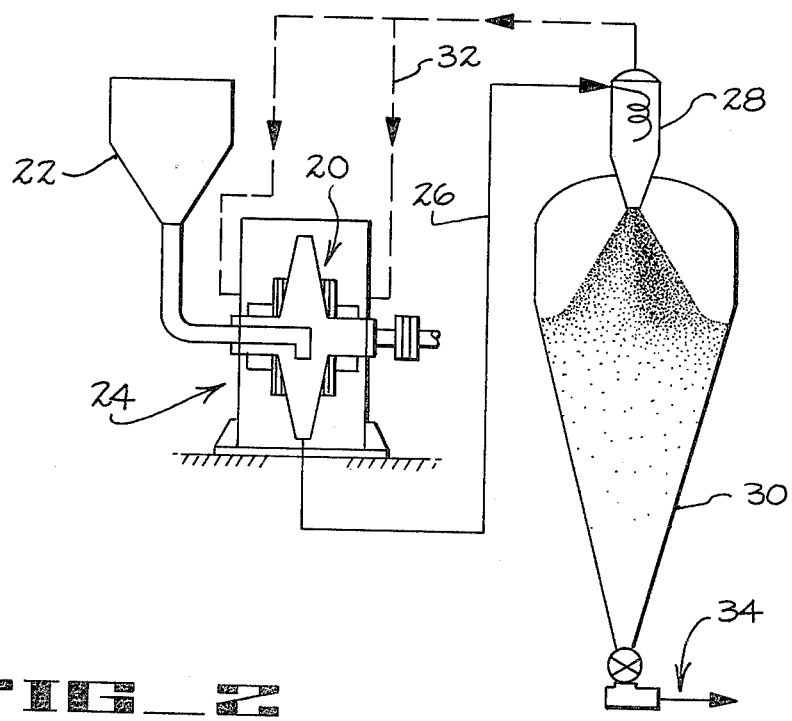
FIG_2

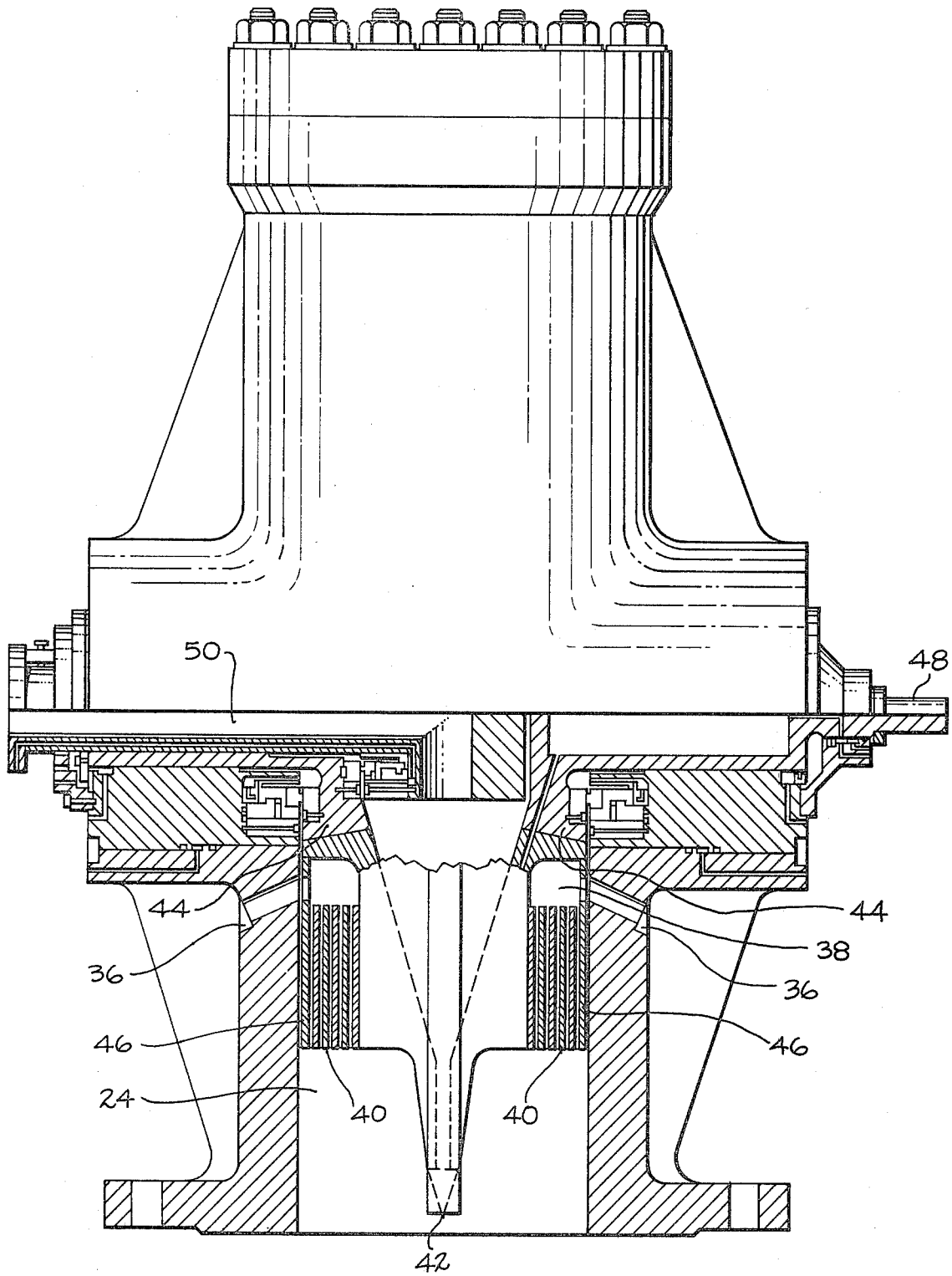
FIG_3

COAL PUMP

TECHNICAL FIELD

The Government has rights in this invention pursuant to Contract No. EX-76-C-01-1792 awarded by the U.S. Department of Energy.

The growing worldwide needs for energy sources have imposed strong demands on energy companies to find new sources of useable energy. A relatively new source of such useable energy is the coal gasification process. In this process, it is necessary to feed pulverized coal from a low pressure environment, usually atmospheric, to the high pressure environment where the coal gasification process takes place.

BACKGROUND ART

Co-pending U.S. patent application, Ser. No. 188,047, filed Sept. 17, 1980, now U.S. Pat. No. 4,376,608, entitled "The Kinetic Extruder—A Dry Pulverized Solid Material Pump", assigned to the same assignee as the present patent application, discloses a method and apparatus for the continuous feeding of pulverized coal to a coal gasification reactor. One of the problems encountered in the coal gasification process is the feeding of pulverized coal from a high pressure storage hopper to the vessel in which the reaction takes place. This is traditionally done by a gas transport system, in which the coal is moved by gas transport to a high pressure coal accumulator. The carrier gas for gas transport is compressed by a conventional compressor. At the high pressure coal accumulator, to save energy, part of the compressed gas is fed back. This system is overly complex and is not as conservative of energy as desired.

DISCLOSURE OF INVENTION

The present invention provides a method and apparatus for feeding material such as pulverized coal into a storage hopper and utilizes a design which pressurizes pulverized coal and circulates a carrying gas within a single piece of machinery, thereby eliminating the need for a collection hopper, the need for extensive gas clean up and the use of a less efficient separate compressor.

BRIEF DESCRIPTION OF THE DRAWINGS

FIG. 1 is a vertical sectional view, with portions shown diagrammatically, of the inventors' prior design gas recycle system, including a coal feeder, FIG. 2 is a vertical sectional view, with portions shown diagrammatically, of the combination kinetic extruder, pump, gas recycle system embodying this invention, FIG. 3 is a vertical sectional view, with portions shown diagrammatically, of the coal feeder embodying this invention.

BEST MODE OF CARRYING OUT THE INVENTION

Referring to FIG. 1, there is shown, for purposes of illustration, inventors' prior design gas recycle system. This system includes a kinetic extruder as described and claimed in co-pending patent application Ser. No. 188,047, filed Sept. 17, 1980, now U.S. Pat. No. 4,376,608, entitled "The Kinetic Extruder—A Dry Pulverized Solid Material Pump", assigned to the same assignee as the present patent application. As described in that patent application, the kinetic extruder 4 feeds coal from an atmospheric hopper forward to a high pressure hopper. The pulverized coal is fluidized by conventional means and fed from collection hopper 6 through conduit 8 to a cyclone separator 10, where the transport gas is separated from the pulverized coal. Pulverized coal, by gravity, is fed to the high pressure coal accumulator 12 from which it can be fed to the reactor, not shown, via pipe 14.

The transport gas is drawn off from the high pressure cyclone separator 10 via compressor 16, which re-compresses the transport gas and feeds it back to the pneumatic transfer line 8 for transporting pulverized coal as indicated above.

Referring now to FIG. 2, there is shown a gas recycle system incorporating the present invention. The system includes a kinetic extruder and pump combination embodying the present invention. Coal is fed from an atmospheric hopper 22 to the kinetic extruder-pump combination 20 which, in turn, feeds the coal to high pressure chamber 24. The pump portion of the kinetic extruder-pump combination maintains sufficient pressure in the high pressure chamber 24 to cause pneumatic transfer of the pulverized coal through pipe 26 into the high pressure cyclone separator 28. The high pressure cyclone separator 28 separates the pulverized coal from the transport gas and feeds the coal to high pressure coal accumulator 30 and the gas to feedback pipe 32.

The pulverized coal is fed from the high pressure coal accumulator 30 through pipe 34 to the reactor (not shown).

Referring now to FIG. 3, there is shown, for purposes of illustration, a rotor that is rotatably mounted in a horizontal axis within the high pressure chamber 24. It is understood, although the rotor shown and described is mounted on a horizontal axis, it could be mounted on a vertical axis, as well. The rotor includes hub portions 44 and Tesla fans 46. As set forth in the above-mentioned patent application, the rotor is rotatably supported by bearings (not shown). In the conventional manner, seals are provided in either side of the bearings to seal the lubricant and to prevent dust or other contaminants from damaging the bearings.

Extending from the hub 44 of the rotor is a drive shaft 48. A motor (not shown) is attached to the drive shaft by any well known means to drive the rotor and pump at the desired speed. A stationary T-shaped feed tube 50 is mounted co-axially within the rotor and incorporates with spin-up zone to feed pulverized coal to the plurality of sprues attached to the hub.

The transport gas enters the machine through inlet ports 36 which permit the gas to be drawn into the center of the pump 38. From here, the gas is compressed through the closely-spaced discs 40 of the Tesla pump and mixes with the pulverized coal discharging through the sprue of the kinetic extruder 42. The solid gas mixture is discharged directly into line 26 of FIG. 2.

We claim:

1. Apparatus for feeding pulverized material from a supply source to a high pressure accumulator, comprising:
   (a) a high pressure housing,
   (b) feed means for supplying pulverized material,
   (c) extruder means disposed in the housing and connected to the feed means for receiving the pulverized material and discharging it at high pressure within the housing,
   (d) said extruder means having a central rotating hub and a plurality of radially extending sprues each terminating with a discharge outlet which rotate therewith, (e) all of the sprues disposed within a common rotating plane perpendicular to the rotating hub, and (f) gas pressurizing means disposed within the housing on said rotating hub adjacent the sprues for directing high pressure gas parallel to and adjacent the plane in which the sprues are disposed.

2. The apparatus for feeding pulverized material to a high pressure accumulator, as set forth in claim 1, wherein:

(a) a transfer conduit is disposed adjacent and spaced from the discharge sprue outlets and substantially in alignment therewith for receiving the material discharged from the sprues and the high pressure gas for transport from the housing at high pressure to a distant point.

3. The apparatus for feeding pulverized material to a high pressure accumulator as set forth in claim 1, wherein:

(a) the gas pressurizing means includes a pump assembly rotatably mounted on the central rotating hub of the extruder.

4. The apparatus for feeding pulverized material to a high pressure accumulator as set forth in claim 1, wherein:

(a) the gas pressurizing means is a disc pump assembly disposed immediately adjacent to the sprues.

5. The apparatus for feeding pulverized material to a high pressure accumulator as set forth in claim 4, wherein:

(a) the disc pump includes a plurality of parallel spaced plates on the rotor which have an inlet cavity disposed adjacent their inner periphery, and (b) a supply conduit for the high pressure gas is disposed in the housing and has an opening adjacent such cavity for supplying transport gas thereto.

6. The apparatus for feeding pulverized material to a high pressure accumulator as set forth in claim 5, wherein:

(a) a transfer line inlet is disposed immediately adjacent and in line with the plane containing the radially disposed sprues.

7. A system for feeding pulverized coal to a high pressure accumulator, comprising:

(a) a high pressure housing, (b) a kinetic extruder disposed within the housing on a rotating hub and having a plurality of sprues extending radially outwardly from the hub, each terminating with a discharge outlet for supplying pressurized coal at high pressure to the interior of the housing.

(c) pulverized coal supply means disposed external of the housing and connected to the kinetic extruder for supplying pulverized coal at low pressure thereto, (d) transport gas pressurizing means disposed within the housing and on said rotating hub adjacent the discharge outlets of the kinetic extruder for supplying a stream of pressurized gas to transport the pulverized coal particles, (e) a fluidized gas-coal mixture transport conduit having an end disposed adjacent and in line with the sprue discharge outlets of the kinetic extruder for receiving a gas-coal mixture and transporting it to a distant point, (f) a cyclone separator connected to the other end of the transport conduit for receiving the pressurized gas and pulverized coal fluidized mixture and separating the pulverized coal from the pressurized transport gas, (g) a transport gas return line connected between the cyclone separator and the transport gas pressurizing means, and (h) a high pressure pulverized coal accumulator for receiving pulverized coal from the cyclone separator.

8. A system for feeding pulverized coal to a high pressure accumulator, comprising:

(a) a high pressure housing, (b) a kinetic extruder disposed within the housing for supplying pressurized coal at high pressure to the interior of the housing, (c) pulverized coal supply means disposed external of the housing and connected to the kinetic extruder for supplying pulverized coal at low pressure thereto, (d) transport gas pressurizing means disposed within the housing and adjacent the outlet of the kinetic extruder for supplying a stream of pressurized gas to transport the pulverized coal particles, (e) a fluidized gas-coal mixture transport conduit having an end disposed adjacent and in line with the discharge of the kinetic extruder for receiving a gas-coal mixture and transporting it to a distant point, (f) a cyclone separator connected to the other end of the transport conduit for receiving the pressurized gas and pulverized coal fluidized mixture and separating the pulverized coal from the pressurized transport gas, (g) a transport gas return line connected between the cyclone separator and the transport gas pressurizing means, and (h) a high pressure pulverized coal accumulator for receiving pulverized coal from the cyclone separator.

* * * * *